United States Patent [19]

Blankevoort et al.

[11] Patent Number: 5,345,277
[45] Date of Patent: Sep. 6, 1994

[54] METHOD OF AND CIRCUIT ARRANGEMENT FOR CONTRAST CORRECTION IN WHICH A CORRECTION SIGNAL DERIVED FROM THE LUMINANCE SIGNAL IS ADDED TO EACH COLOR SIGNAL

[75] Inventors: Jaap E. Blankevoort, Eindhoven; Johannes H. J. M. Van Rooy, Den Bosch; Hubertus C. Voet, Breda, all of Netherlands

[73] Assignee: U.S. Philips Corporation, New York, N.Y.

[21] Appl. No.: 8,930

[22] Filed: Jan. 26, 1993

[30] Foreign Application Priority Data

Feb. 4, 1992 [DE] Fed. Rep. of Germany ....... 4203092

[51] Int. Cl.$^5$ .......................... H04N 5/57; H04N 9/64
[52] U.S. Cl. .................................................. 348/679
[58] Field of Search ................... 358/27, 169, 28, 32, 358/164, 168, 21 R, 171, 174; 348/348, 645, 678, 649, 675, 687, 679, 692; H04N 9/64, 5/57

[56] References Cited

U.S. PATENT DOCUMENTS

| | | | |
|---|---|---|---|
| 4,241,362 | 12/1980 | Van der Valk | 358/32 |
| 4,489,349 | 12/1984 | Okada | 358/168 |
| 4,755,726 | 7/1988 | Baker | 358/168 |
| 4,800,433 | 1/1989 | Kamemoto | 358/168 |
| 4,847,524 | 7/1989 | Van Rooy et al. | 358/32 |
| 5,134,465 | 7/1992 | Ohki | 358/27 |

FOREIGN PATENT DOCUMENTS

| | | |
|---|---|---|
| 0235862 | 2/1987 | European Pat. Off. . |
| 2855189 | 6/1979 | Fed. Rep. of Germany . |
| 3135292 | 6/1991 | Japan . |
| 4152787 | 5/1992 | Japan . |

*Primary Examiner*—James J. Groody
*Assistant Examiner*—Sherrie Hsia
*Attorney, Agent, or Firm*—Edward W. Goodman

[57] ABSTRACT

A method of and circuit arrangement for contrast correction of color television signals is proposed, which is used for black stretching. A luminance signal (Y) is formed by matrixing from the (gamma-corrected) chrominance signals (R, G, B), while a correction signal is derived from the luminance signal, which correction signal is largest in the proximity of the black level and becomes zero in the blanking interval and in the proximity of the white level. This correction signal is added to each chrominance signal.

7 Claims, 2 Drawing Sheets

METHOD OF AND CIRCUIT ARRANGEMENT FOR CONTRAST CORRECTION IN WHICH A CORRECTION SIGNAL DERIVED FROM THE LUMINANCE SIGNAL IS ADDED TO EACH COLOR SIGNAL

BACKGROUND OF THE INVENTION

1. Field of the Invention

The invention relates to a method of contrast correction of color television signals.

In color television, small contrast differences which are present in the dark parts of a scene are not transmitted clearly enough, and, as is known, the video signal transmission path therefore incorporates circuit arrangements the stretching the amplitude of the video signals in these dark parts. These circuit arrangements are known as black stretching circuits.

In addition to the known and conventional gamma correction for adapting the linear opto-electronic pick-up characteristic to the non-linear electro-optical display characteristic, this additional contrast correction is also efficient because it can compensate for the limited magnitude of contrast in television pick-up and display apparatuses when pictures or natural scenes which are rich in contrast are processed.

2. Description of the Related Art

A circuit arrangement for contrast correction or black stretching is known from DE 28 55 189 A1, corresponding to U.S. Pat. No. 4,241,362, in which, after connection, a correction signal derived from a gamma-corrected luminance signal can be superimposed on the luminance signal. This known circuit arrangement has the drawback that it may generate unwanted step-shaped jumps in brightness in the contrast-corrected luminance signal.

SUMMARY OF THE INVENTION

It is therefore an object of the present invention to provide a method and a circuit arrangement of the type described in the opening paragraph with which a steady contrast correction signal can be formed in a simple manner and which can be applied to each color channel of a color picture signal generator.

This object is solved by a method of contrast correction of color television signals, characterized in that a correction signal is derived from a luminance signal (Y). This correction signal is largest in proximity of the black level and becomes zero in the blanking interval and in the proximity of the white level. This correction signal is added to each color signal.

The method according to the invention has the advantage that the steady contrast correction signal can be changed or adjusted by simple means and influences the color signal in each color channel to an equal extent. A further advantage is that the correction signal can be used independently of the color signal coding at any arbitrary point in the operation of processing the color signals in the picture signal generator.

BRIEF DESCRIPTION OF THE DRAWINGS

These and other aspects of the invention will be apparent from and elucidated with reference to the embodiments described hereinafter. In the drawings.

DESCRIPTION OF THE PREFERRED EMBODIMENT

Figure 1:
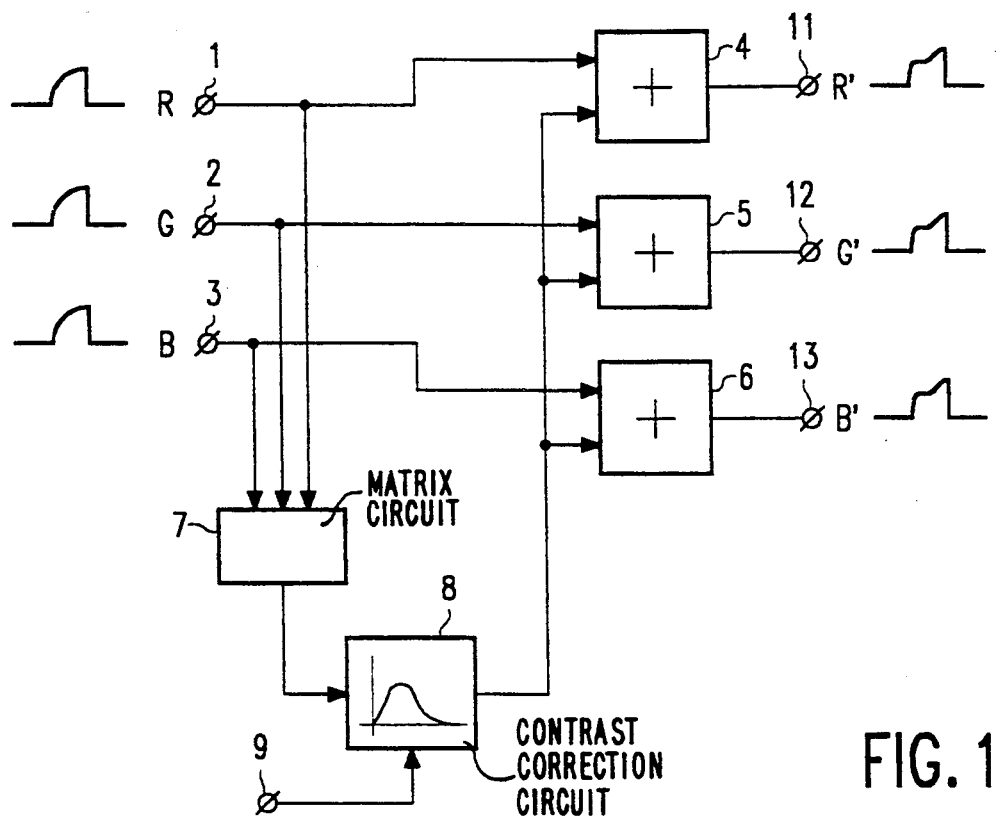
FIG. 1 is a block diagram of the contrast correction according to the invention.

In the block diagram of FIG. 1, the color signals R, G and B, present at the terminals 1, 2, 3, respectively, and generated by a picture signal source (not shown in the Figure), are applied to adder stages 4, 5 and 6 arranged in the main signal path and to an input of, a matrix 7 for generating the luminance signal. The three color signals R, G, B may have been gamma-corrected - as is shown in the Figure - or this correction may be carried out at a later stage. The adder stages 4, 5, 6, may be arranged anywhere in the video signal processing paths for the color signals R, G, B.

A luminance signal Y derived from the color signals R, G, B can be taken from the output of the matrix 7 and is applied to a subsequent circuit 8 for forming the contrast correction signal. The generation of this contrast correction signal will be further explained with reference to the description of FIGS. 2 and 3. A contrast correction signal is then taken from the output of the circuit 8 and is applied to the respective other inputs of the adder stages 4, 5, 6 so that the contrast-corrected or black-stretched color signals R', G' and B' are taken from the outputs 11, 12, 13 of the adder stages 4, 5, 6.

The shape of the curve of the correction signal formed in the circuit 8 may be influenced by means of a control voltage at terminal 9. This control voltage may advantageously be generated in remote control units and transmitted to the terminal 9. The contrast correction signal formed in the circuit 8 and used for black stretching of the video signal has a very strong signal rise and a large amplitude in the proximity of the reference level, while it is zero in the proximity of the white level and in the blanking intervals.

Figure 2:
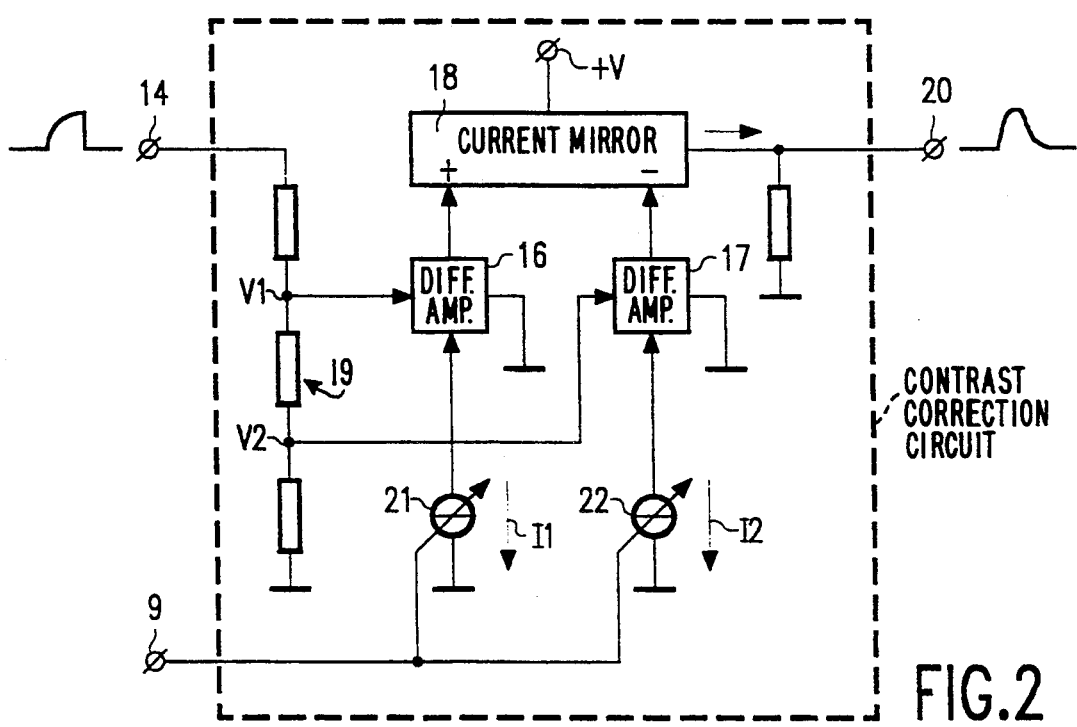
FIG. 2 shows a circuit for deriving the contrast correction signal.

FIG. 2 shows the circuit for forming the contrast correction signal in somewhat greater detail, with the input luminance signal being present at terminal 14. In principle, such a circuit is already known from EP 0 235 862 B1 corresponding to U.S. Pat. No. 4,847,524, for a gamma correction, in which two non-linear, i.e. hyperbolic tangent functions generated by differential amplifiers are added in a current mirror circuit. In the circuit according to the present invention, however, the two non-linear functions generated by two differential amplifiers 16 and 17 are subtracted in current mirror 18. The two differential amplifiers 16, 17 are also driven into saturation at different level values by the signal voltages which are different at their inputs and have been derived from the voltage divider 19. The current sources 21 and 22 also supply currents 11 and 12 which are constant in dependence upon the voltages V1 and V2, respectively. The current sources 21 and 22 can be remote-controlled by means of a control voltage applied via a terminal 9, with which the rise of the correction signal and the degree of black stretching can be varied. A corresponding contrast correction signal can then be taken from the output 20 of the circuit 8.

Figure 3:
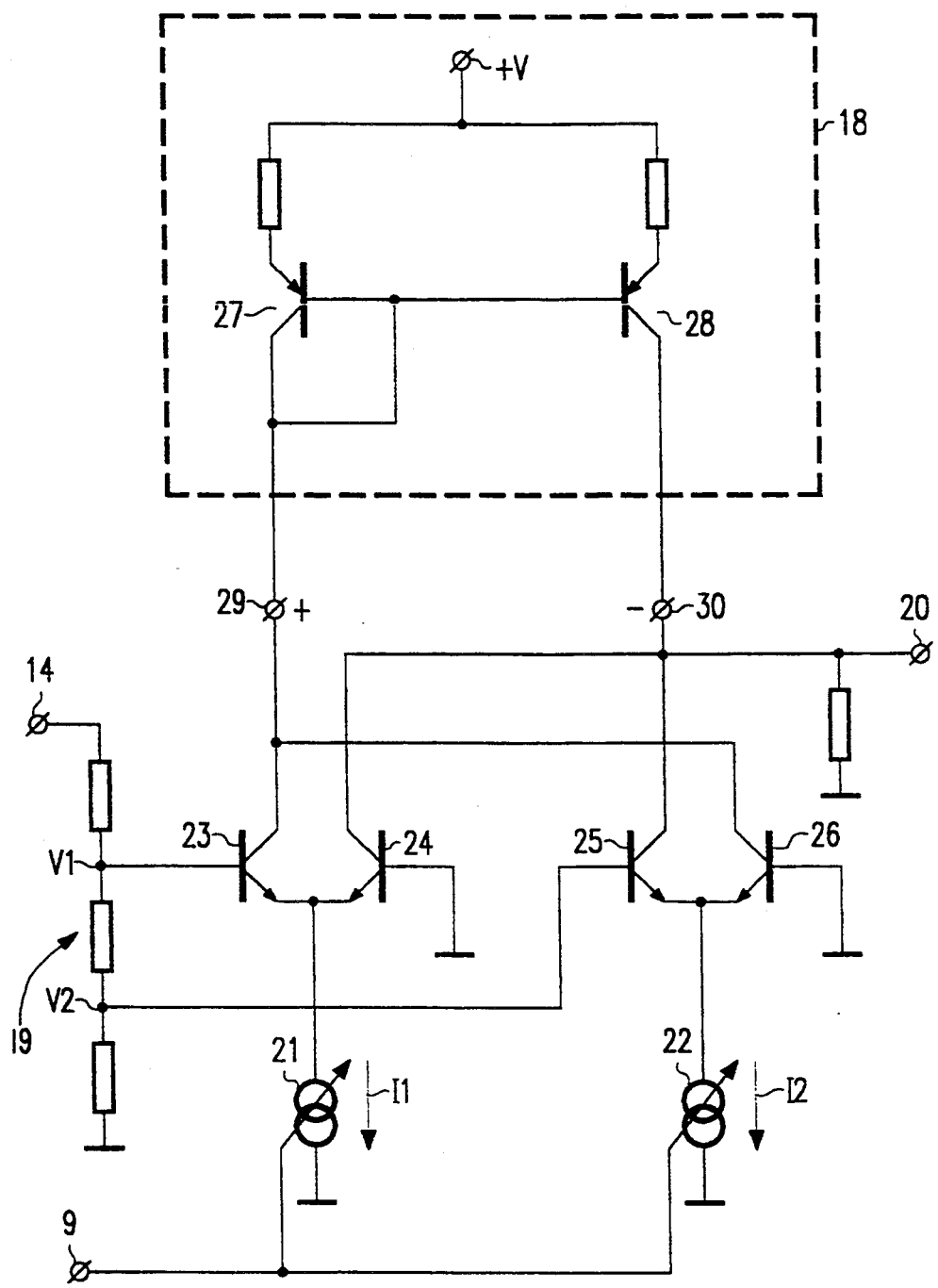
FIG. 3 shows a detailed circuit in accordance with FIG. 2.

The detailed circuit shown in FIG. 3 essentially corresponds to the circuit shown and described in EP 0 235 862 B1. In this circuit the differential amplifiers 16 and 17 also comprise two emitter-coupled transistors 23, 24 and 25, 26, with the base electrodes of the transistors 23 and 25 each receiving an input signal of different value via the voltage divider 19, and the base electrodes of the transistors 24 and 26 being connected to the reference potential. The collectors of transistors 23 and 26 are interconnected and connected to positive terminal 29 of current mirror 18. Similarly, the collectors of transistors 24 and 25 are interconnected and connected to the negative terminal 30 of current mirror 18. The emitter circuit of the transistors 23 and 24 incorporates the current source 21 and the emitter circuit of the transistors 25 and 26 incorporates the current source 22. The current mirror circuit 18 also comprises two transistors 27 and 28 which are connected to the outputs of the differential amplifiers via the connections 29 and 30 so that the desired contrast correction signal can be taken from the output 20. The currents of the differential amplifiers 23, 24 and 25, 26 generated in accordance with the hyperbolic tangent functions are formed by the differential amplifier transistor pairs 23, 24 and 25, 26 which are driven into saturation at different input signal voltages V1, V2. The form of the correction signal may be realized not only by different voltage levels at the voltage divider 19 but also by different currents of the current sources 21 and 22.

We claim:

1. A method of contrast correction of color television signals, said color television signals having a blanking interval, characterized in that said method comprises the steps:

deriving a luminance signal (Y) from said color television signals, the luminance signal having a black level and a white level, along with the blanking interval;

deriving a correction signal from the luminance signal (Y), said correction signal having a maximum value in proximity of the black level in the luminance signal, said correction signal becoming zero in the blanking interval and in proximity of the white level in the luminance signal; and adding said correction signal to each color signal of said color television signals.

2. A method as claimed in claim 1, characterized in that the correction signal is derived from the luminance signal by means of variable, non-linear amplification.

3. A method as claimed in claim 2, characterized in that the correction signal is formed by subtraction of two signal currents varying in accordance with a hyperbolic tangent function, said currents being derived from different input signal voltages of the luminance signal.

4. A circuit arrangement for performing contrast correction on color television signals including three color signals (R, G, B), characterized in that said circuit arrangement comprises:

a matrix having inputs for receiving the three color signals (R, G, B) and having an output for supplying a luminance signal (Y) derived from the three color signals;

a circuit for deriving a correction signal, said circuit having an input for receiving the luminance signal, and an output for supplying the correction signal, said correction signal having a maximum value in proximity of a black level in the luminance signal, said correction signal becoming zero in a blanking interval and in proximity of a white level in the luminance signal; and three adder stages having respective first inputs coupled to the output of said circuit for deriving a correction signal, respective second inputs coupled to receive the three color signals (R, G, B), respectively, and respective outputs for supplying respective corrected color signals (R', G', B').

5. A circuit arrangement as claimed in claim 4, characterized in that the circuit for deriving the correction signal comprises:

a first and a second non-linear differential amplifier, said first and said second differential amplifiers being capable of being driven into saturation at different input signal values (V1, V2), said first and second differential amplifiers each having an output;

a first and a second adjustable current source for supplying different, substantially constant currents for the first and the second differential amplifiers, respectively; and a current mirror circuit for providing a common supply circuit for the first and the second differential amplifiers, said current mirror circuit having a first connection and a second connection coupled, respectively, to the outputs of the first and second differential amplifiers, wherein said current mirror circuit subtracts an amplifier current of the second differential amplifier from an amplifier current of the first differential amplifier, the second connection being connected to the output of the circuit for deriving the correction signal.

6. A circuit arrangement as claimed in claim 5, characterized in that the first and the second differential amplifiers each comprise a pair of emitter-coupled transistors, the emitter-coupled leads of the pair of emitter-coupled transistors of the first differential amplifier being coupled to the first adjustable current source, and the emitter-coupled leads of the pair of emitter-coupled transistors of the second differential amplifier being coupled to the second adjustable current source, a base electrode of a first transistor in each pair of emitter-coupled transistors being connected to said different input signal values (V1, V2), while a base electrode of a second transistor in each pair of emitter-coupled transistors being connected to a reference potential, and a collector of the first transistor of the first differential amplifier and a collector of the second transistor of the second differential amplifier being connected to the first connection of said current mirror circuit, and a collector of the first transistor of the second differential amplifier and a collector of the second transistor of the first differential amplifier being connected to the second connection of said current mirror circuit.

7. A circuit as claimed in claim 6, characterized in that the current sources are adjusted by means of remote control.

* * * * *